GEORGE SMITH, OF PROVIDENCE, RHODE ISLAND, ASSIGNOR TO HIMSELF AND JOHN C. DE LANY, OF DETROIT, MICHIGAN.

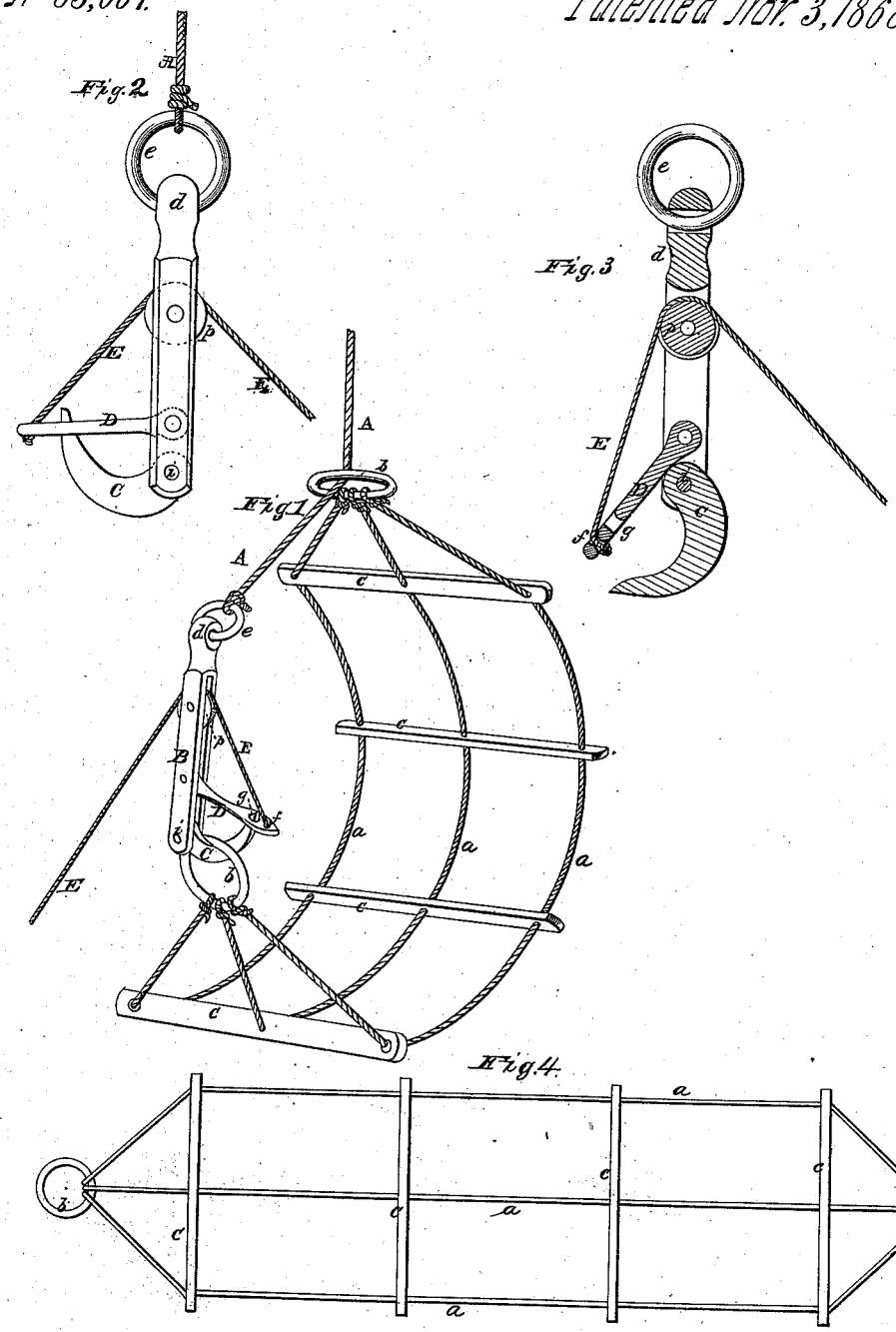

Letters Patent No. 83,667, dated November 3, 1868.

IMPROVED DEVICE FOR UNLOADING HAY.

The Schedule referred to in these Letters Patent and making part of the same.

*To all whom it may concern:*

Be it known that I, GEORGE SMITH, of Providence, in the county of Providence, and State of Rhode Island, have invented certain new and useful Improvements for Unloading Hay from wagons and elevating it upon stacks and in barns; and I do hereby declare that the following is a full, clear, and exact description thereof, reference being had to the accompanying drawings, making a part of this specification, in which—

Figure 1 is a perspective view of the unloading-device as it would appear when in the act of elevating a body of hay.

Figure 2 is a side view of the elevating and detaching-hook, and to connect the sling with the elevating-rope, and to readily detach the load when elevated to the proper point.

Figure 3 is a sectional view of the detaching-hook, showing the hook released from its tripping-catch.

Figure 4 is a view showing one form of sling, which is adapted for embracing a body of hay.

Similar letters of reference indicate corresponding parts in the several figures.

The nature of my invention consists in a novel combination of parts in the construction of an apparatus for unloading hay from wagons; the said parts being so constructed and applied that the releasing-hook, or latch thereof, can be operated from a low or high position, with respect to the ground, and while this is so, the latch is pulled up, out of latching-position by its front end, by means of a cord passing over a pulley in the hook-shank or stem. The arrangement and construction, also, are such that the sling of the apparatus acts to compress each layer of the load of hay, and also to give the same a wide support during the operation of unloading and lifting from the wagon.

To enable others skilled in the art to understand my invention, I will describe its construction and operation.

The sling which I have represented in figs. 1 and 4 is composed of three ropes, $a\ a\ a$, connected at their extremities to rings $b\ b$, and separated by means of transverse trips $c\ c\ c$, through which the ropes pass, and to which they are respectively secured in any suitable manner. I prefer to construct the slings in the manner described, although I do not confine myself to this particular construction.

Instead of ropes, chains or links may be used, which, like the ropes, will afford the required degree of flexibility.

The object of the sling thus described is to afford a wide support for a mass of hay or other similar substance, so that a large quantity thereof can be embraced and compressed in a suitable condition to be elevated from a wagon and discharged upon a stack, as will be hereinafter explained.

In conjunction with a sling constructed substantially as described, I employ a device for attaching the sling, when applied around a mass of hay or other substance to be elevated, to the elevating-rope A, which device is provided with a pull-cord, that will allow of the load being discharged when it has been raised to the proper point.

This device consists of a centrally-forked shank, B, having an eye, $d$, through its upper end, for receiving a ring, $e$, to which the elevating-rope A is attached.

Between the lower ends of the shank B, a strong hook, C, is pivoted, by a transverse pin, $i$, so as to swing loosely about this pin. Directly above the pin $i$, a tongue, D, is pivoted, between the forked portions of the shank B, so as to swing freely.

This tongue has an eye, $g$, through it, for receiving the point of the hook C, when the latter is set, as shown in fig. 2.

The tongue also has an eye, $f$, through its free extremity, to allow of the attachment of a pull-cord, E.

This cord passes upward over a grooved pulley, $p$, and is thence carried off, to be pulled by the operator, standing upon the ground, when he desires to discharge a load that has been elevated to a proper height.

It will be seen that the tongue D will serve as a simple means for holding the hook C in a position for sustaining a load, and that said hook will be supported at its outer free end positively and safely by said pivoted tongue, and at its opposite end by the pivot-pin $i$. It will also be seen that the greater the weight which is suspended by the hook, the more firmly will this hook be held by the tongue D; and, while this is the case, a slight pull upon the cord E will raise the free end of the tongue D, and release the hook C, allowing it to drop, as shown in fig. 3, and thus discharge the load.

Having now described the devices which I employ in carrying out my invention, I will describe the method of employing these devices.

Before commencing to load a wagon with hay or other substance, I spread upon the body of the wagon one of the slings, laying it either crosswise or lengthwise thereof.

When a sufficient quantity of hay has been thrown upon the wagon to make a load equal to the capacity of the sling for embracing it, another sling is laid upon the hay, and so on, layer after layer of hay is thrown upon the wagon, with the slings interposed between them, until the wagon is properly loaded.

Upon arriving at the place for depositing the hay, in a barn or in stacks, the operator makes use of the elevating-rope and its hook for discharging the load from the wagon.

The elevating-rope may be hung from a beam or derrick, and provided with a windlass, or horses may be used to raise and lower the loads.

The detaching-hook, which is supposed to be attached to one end of the rope A, is passed through one of the rings, and carried over the load, and attached to the opposite ring of the sling, which lies under the highest layer of hay upon the wagon. The operation of raising then commences, previous to which, however, the resistance offered by the weight of the load will cause the sling and elevating-rope to be drawn tightly about the load, so as to compress it into a bundle, and hold it firmly.

When the load has been raised to the proper height and point, the attendant pulls the cord E, which will release the hook C from its tongue D, and allow the hay to fall.

Fig. 1 shows clearly the manner of applying the sling, the hook, and the elevating-rope, around a bundle or mass of hay, or other like product; and it will be seen that a portion of the elevating-rope embraces the load, thereby allowing the weight of the latter to operate continually, during the act of raising, to draw the parts tightly about it.

By this arrangement, the load will be partly hung from the hook, and partly from the elevating-rope.

If desirable to use two short slings, instead of a single one, of proper length to embrace a load, I attach the hooking-device permanently to one of the rings of one sling, and connect the slings together by this hook. The opposite ends of the slings would in this case be connected around a load by the hoisting-rope and a common hook. The load would be discharged by releasing the lower hook, leaving the two slings attached to the upper hook.

Having described my invention,

What I claim as new, and desire to secure by Letters Patent, is—

The combination and arrangement of the hook C, latch D, cords E and A, pulley $p$, for latch-cord E, sling $a\ c$, and rings $b\ b$, all constructed and operating substantially in the manner described.

GEORGE SMITH.

Witnesses:
J. N. CAMPBELL,
R. T. CAMPBELL.